(12) United States Patent
Nack et al.

(10) Patent No.: US 9,489,614 B2
(45) Date of Patent: *Nov. 8, 2016

(54) DISPLAYING AN ANIMATED DIGITAL WATERMARK

(71) Applicant: Comenity LLC, Columbus, OH (US)

(72) Inventors: David Nack, Bexley, OH (US); James Eversole Donovan, Upper Arlington, OH (US)

(73) Assignee: Comenity LLC, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/670,341

(22) Filed: Mar. 26, 2015

(65) Prior Publication Data

US 2015/0199604 A1 Jul. 16, 2015

Related U.S. Application Data

(63) Continuation of application No. 14/058,031, filed on Oct. 18, 2013, now Pat. No. 9,147,152.

(51) Int. Cl.
G06K 19/06 (2006.01)
G06K 19/14 (2006.01)
G06K 19/10 (2006.01)
G06T 13/80 (2011.01)
G06Q 20/32 (2012.01)
G06Q 20/40 (2012.01)

(52) U.S. Cl.
CPC ............ G06K 19/14 (2013.01); G06K 19/10 (2013.01); G06Q 20/3274 (2013.01); G06Q 20/4014 (2013.01); G06T 13/80 (2013.01)

(58) Field of Classification Search
USPC .................... 235/494, 383, 381; 705/41
See application file for complete search history.

(56) References Cited

U.S. PATENT DOCUMENTS

| | | | |
|---|---|---|---|
| 7,369,679 B2 | 5/2008 | Ameline et al. | |
| 7,634,295 B2 | 12/2009 | Hayaashi et al. | |
| 9,147,152 B2 * | 9/2015 | Nack .................. | G06K 19/14 |
| 2006/0004630 A1 | 1/2006 | Criddle et al. | |
| 2007/0047764 A1 * | 3/2007 | Ameline ............. | G06T 1/0021 382/100 |
| 2012/0310760 A1 | 12/2012 | Phillips et al. | |
| 2013/0091044 A1 * | 4/2013 | Reed ................... | G06Q 20/34 705/35 |
| 2014/0244514 A1 | 8/2014 | Rodriguez et al. | |
| 2014/0297530 A1 | 10/2014 | Eckel et al. | |

* cited by examiner

*Primary Examiner* — Ahshik Kim

(57) ABSTRACT

A computer-implemented method for displaying an animated digital watermark including the display of a mobile payment card on a mobile display screen, wherein the mobile payment card is linked to a payment system, and the display of an animated digital watermark on the mobile display screen to ensure authenticity of the displayed mobile payment card.

14 Claims, 4 Drawing Sheets

DISPLAYING AN ANIMATED DIGITAL WATERMARK

RELATED APPLICATIONS

This application is a continuation of and claims the benefit of co-pending U.S. patent application Ser. No. 14/058,031 filed on Oct. 18, 2013 entitled "DISPLAYING AN ANIMATED DIGITAL WATERMARK" by David Nack et al., which is assigned to the assignee of the present invention, and is hereby incorporated by reference in its entirety.

BACKGROUND

Purchases may be provided via a digital credit card, implemented on a mobile device, rather than by presenting a physical credit card. Unauthorized duplication of the digital credit card may occur even after proper authentication of the digital credit card on the mobile device.

For example, a perpetrator may know or guess the authentication credentials to access the account of the digital credit card. The perpetrator may then take a screen capture of the displayed digital credit card and use the captured screen shot as a fraudulent copy of the digital credit card. Additionally, the perpetrator may take a photo or a video of the digital credit card with another device. The fraudulent copy of the digital credit card may then redistributed for fraudulent use on another device by persons other than the account owner.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Figure 1:
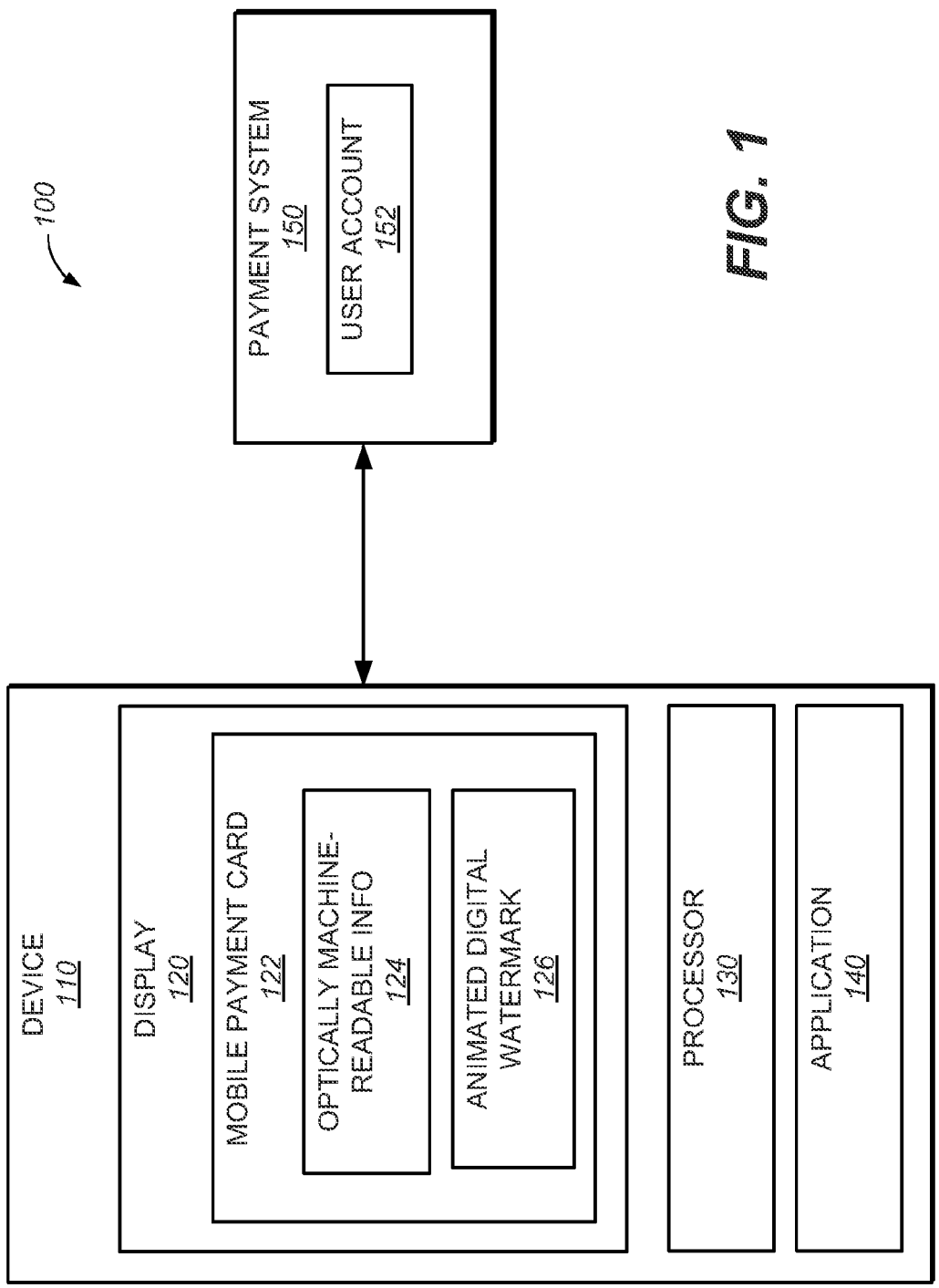
FIG. 1 is a block diagram that illustrates an embodiment of a device and payment system.

FIG. 1 depicts a block diagram that illustrates an embodiment of system 100. System 100 includes device 110 communicatively coupled with payment system 150.

Device 110 includes display 120 that is able to display mobile payment card 122. Device 110 may be a mobile device such as a smart phone, tablet, etc.

Display 120, in one embodiment, is a touch screen, such that a user is able to interact with displayed features on the touch screen.

Mobile payment card 122 can be any digital payment card that is able to be displayed on display 120 and utilized for purchases. In one embodiment, mobile payment card 122 is implemented via application 140. That is, application 140 (e.g., a mobile application) is downloaded onto device 110. When a user of device 110 selects application 140 to be utilized, processor 130 executes application 140 such that mobile payment card 122 is displayed on display 120. In another embodiment, mobile payment card 122 is supported by being downloaded over the Internet.

In one embodiment, mobile payment card 122 is a mobile credit card or a digital credit card. That is, the mobile payment card 122 is an electronic or digital version of a physical credit card. In general, a credit card is issued to users as a system of payment. It allows the cardholder to pay for goods and services based on the holder's promise to pay for them. The issuer of the card creates a revolving account and grants a line of credit to the consumer (or the user) from which the user can borrow money for payment to a merchant or as a cash advance to the user.

In various embodiments, mobile payment card 122 may be a mobile debit card, mobile cash card, mobile gift card, etc.

Mobile payment card 122 includes optically machine readable information 124. Optically machine readable information 124 is any machine readable (or scanable) information that is able to be displayed on display 120 that enables access to or information related to user account 152 of payment system 150. Optically machine readable information 124 can include, but is not limited to, name of user, billing address, account number, account balance/limit, card provider information, etc.

Optically machine readable information 124 can be, but is not limited to, a bar code (1D, 2D), quick response (QR) code, matrix code, etc.

In various embodiments, access to or information related to user account 152 may be accomplished by various means, such as, but not limited to, audio signals, Bluetooth low energy (LE), near field communication (NFC), etc.

Payment system 150 is any payment entity or mechanism that allows for purchases based on mobile payment card 122. For example, payment system 150 is an entity that issued mobile payment card 122 such as a bank, a corporation, etc.

At the time of purchase, mobile payment card 122 is displayed on display 120 and presented to the merchant. For example, in one embodiment, optically machine readable information 124 is scanned by an optical scanner (e.g., bar code reader) to verify user account 152 within payment system 150 and to enact the purchase transaction. Verification may be accomplished by audio signals, Bluetooth LE, NFC, etc.

Additionally, mobile payment card 122 also includes animated digital watermark 126 that is displayed on display 120.

The term "animated digital watermark", as used herein, is any visually perceptible image that is dynamically moving or animated that facilitates in ensuring that mobile payment card is authentic (or not fraudulent).

Animated digital watermark 126, by being animated, provides visual evidence that mobile payment card 122 is not a fraudulent copy. More specifically, animated digital watermark 126 provides visual evidence that the displayed mobile payment card 122 is not a fraudulent captured static image of the authentic mobile payment card.

For example, a merchant visually examining the mobile payment card displayed on device 110 will notice the dynamic moving properties of animated digital watermark 126 and determine that mobile payment card 122 is authentic and not fraudulent.

Animated digital watermark 126 can be any image with dynamic (or visually moving/changing) properties. For example, animated digital watermark 126 is a rotating logo of the bank that issued mobile payment card. In another example, animated digital watermark 126 is an image that constantly or variably changes shape, color, and/or position.

In various embodiments, animated digital watermark 126 varies based on the day, time, session, etc.

It should also be appreciated that other features of mobile payment card 122 may dynamically change. For example, the background may change in color based on day, time, session, etc.

In one embodiment, animated digital watermark 126 is a user-interactive animated digital watermark. For example, a message is displayed in response to a user selecting animated digital watermark 126 on the touch screen display. The displayed message, in response to the touch by the user, provides visual evidence that the displayed mobile payment card 122 is not a fraudulent captured video of the authentic mobile payment card because a captured video of mobile payment card 122 (including animated digital watermark) would not be able to display a message in response to a user touching the animated digital watermark in the fraudulent video.

Figure 2:
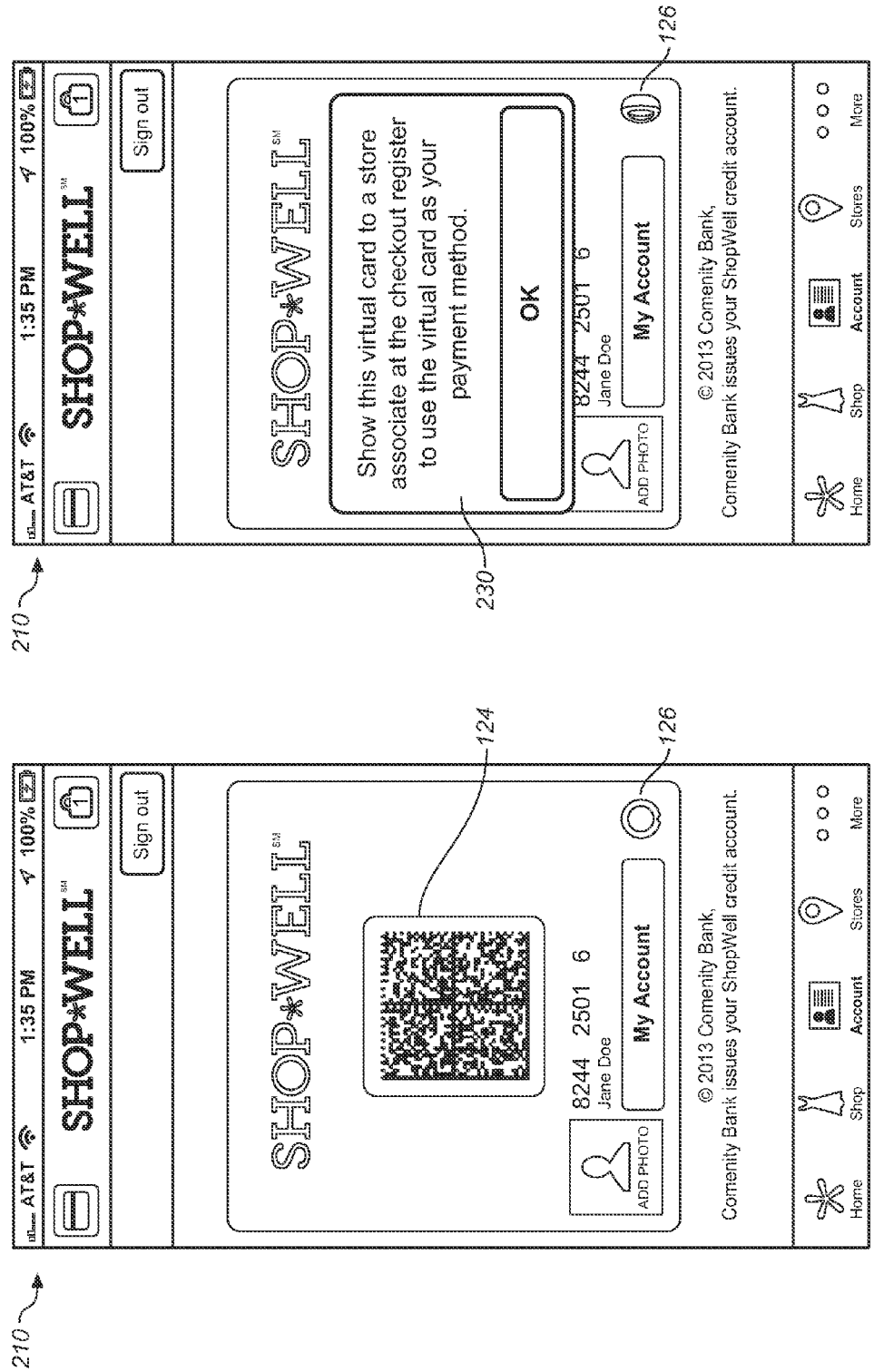
FIG. 2A illustrates an embodiment of device displaying a mobile payment card.
FIG. 2B illustrates an embodiment of device displaying a mobile payment card.

FIGS. 2A and 2B depict embodiments of mobile payment card 210 displayed on a mobile device. Mobile payment card 210 includes optically machine readable information 124 (i.e., QR code) and animated digital watermark 126.

During use, at the point of sale, the user of the mobile device shows a merchant mobile payment card 210 that is displayed on the touch screen. The merchant will be able to see animated digital watermark 126 and determine that mobile payment card 210 is authentic. Additionally, in response to animated digital watermark 126 being touched (e.g., by the user or merchant) message 230 is displayed, as depicted in FIG. 2B.

Message 230 can be information/message that provides visual evidence that the displayed mobile payment card 210 is not a fraudulent captured video of the authentic mobile payment card.

Example Methods of Operation

Figure 3:
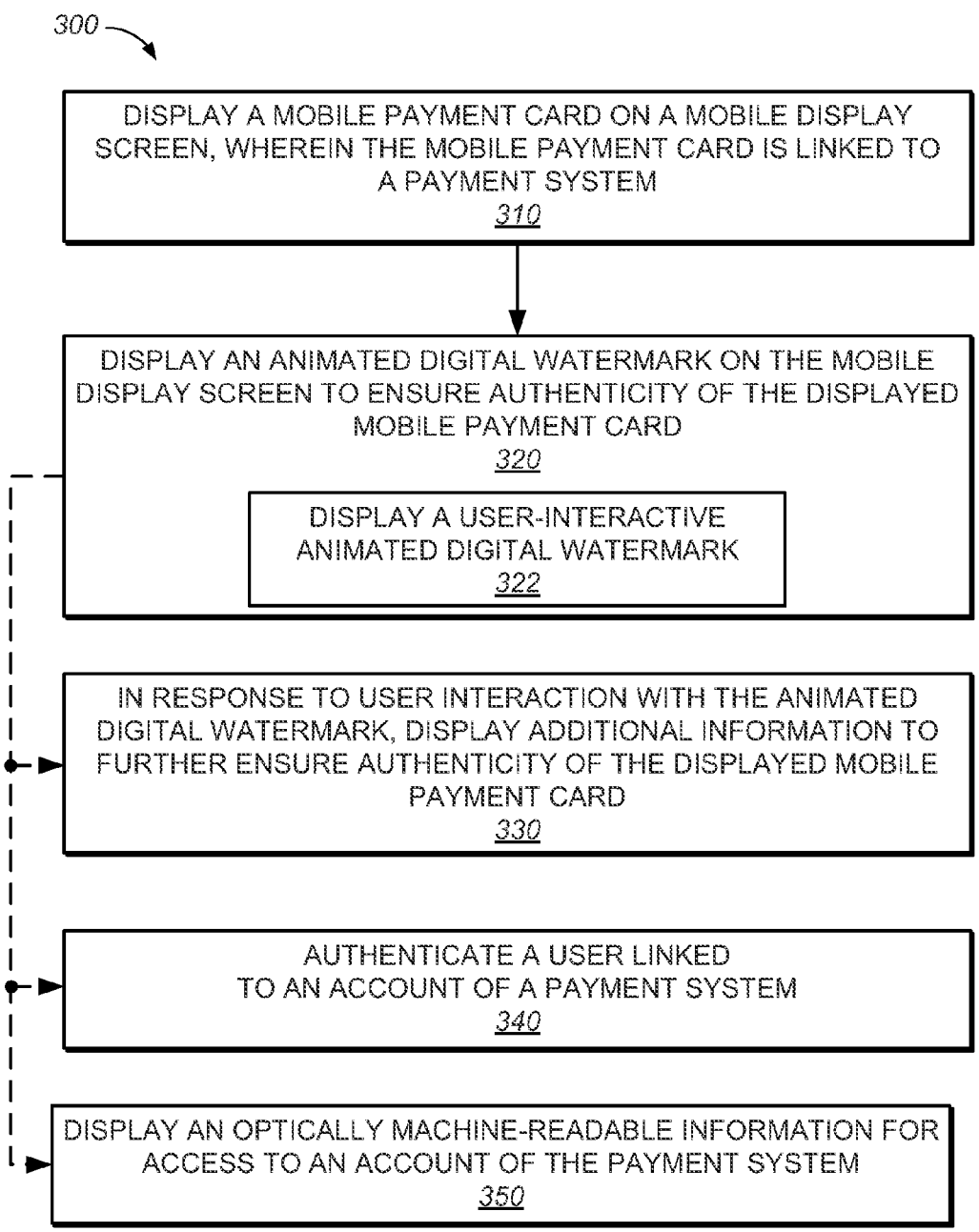
FIG. 3 depicts a flow diagram for a method for displaying an animated digital watermark, according to various embodiments.
Figure 4:
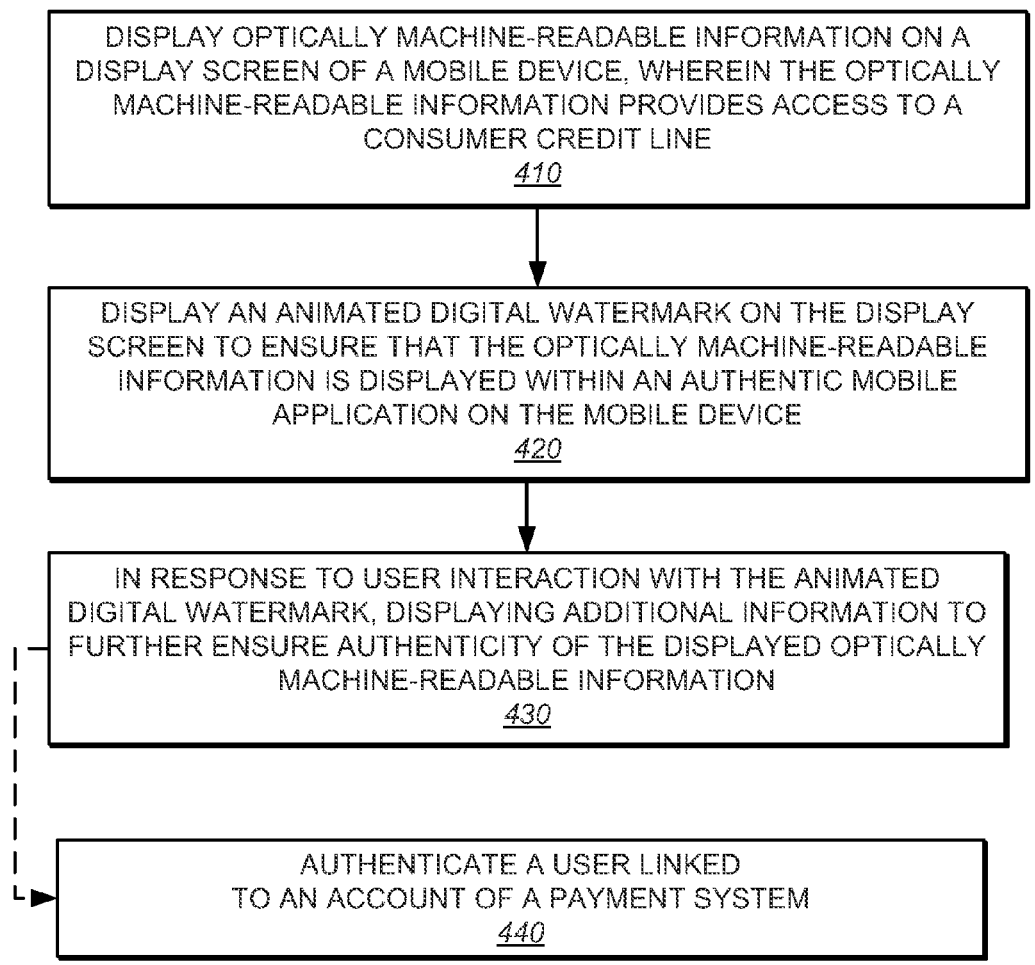
FIG. 4 depicts a flow diagram for a method for displaying an animated digital watermark, according to various embodiments.

The following discussion sets forth in detail the operation of some example methods of operation of embodiments. With reference to FIGS. 3 and 4, flow diagrams 300 and 400 illustrate example procedures used by various embodiments. Flow diagrams 300 and 400 include some procedures that, in various embodiments, are carried out by a processor under the control of computer-readable and computer-executable instructions. In this fashion, procedures described herein and in conjunction with flow diagrams 300 and 400 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g. device 110, payment system 150, etc.). The computer-readable and computer-executable instructions, which reside on tangible computer readable storage media, are used to control or operate in conjunction with, for example, one or some combination of processors of the computer environments. It is appreciated that the processor(s) may be physical or virtual or some combination (it should also be appreciated that a virtual processor is implemented on physical hardware). Although specific procedures are disclosed in flow diagrams 300 and 400, such procedures are examples. That is, embodiments are well suited to performing various other procedures or variations of the procedures recited in flow diagrams 300 and 400. Likewise, in some embodiments, the procedures in flow diagrams 300 and 400 may be performed in an order different than presented and/or not all of the procedures described in one or more of these flow diagrams may be performed. It is further appreciated that procedures described in flow diagrams 300 and 400 may be implemented in hardware, or a combination of hardware with firmware and/or software.

FIG. 3 depicts flow diagram 300 for a method for displaying an animated digital watermark, according to various embodiments.

Referring now to FIG. 3, at 310, a mobile payment card is displayed on a mobile display screen, wherein the mobile payment card is linked to a payment system. For example, a user selects a mobile payment application (e.g., application 140) on device 110. Processor 130 executes the selected mobile payment application such that mobile payment card 122 is rendered on display 120 such that a mobile payment transaction can be executed.

At 320, an animated digital watermark is displayed on the mobile display screen to ensure authenticity of the displayed mobile payment card. For example, animated digital watermark 126 is displayed on display 120 based on processor 130 executing the mobile payment application.

As described above, animated digital watermark 126 facilitates in ensuring that the displayed mobile payment card 122 is not a fraudulent static image of an authentic mobile payment card, because a static image cannot include a dynamic moving feature.

At 322, in one embodiment, a user-interactive animated digital watermark is displayed. For example, a user is able to interact with animated digital watermark 126 to facilitate in ensuring that the displayed mobile payment card 122 is not a fraudulent video of an authentic mobile payment card.

At 330, in one embodiment, in response to user interaction with the animated digital watermark, additional information is displayed to further ensure authenticity of the displayed mobile payment card. For example, referring to FIG. 2B, in response to a merchant touching animated digital watermark 126, pop-up message 230 is displayed.

At 340, in one embodiment, a user linked to an account of a payment system is authenticated. For example, the user of mobile device 110 has user account 152 (e.g., a consumer line of credit) with payment system 150 (e.g., a bank). Accordingly, the user provides his login name and password such that the user is authenticated to display mobile payment card 122 on device 110.

It is noted that, in one embodiment, the watermark does not affect the authentication, and the watermark is not required for authentication to take place. Moreover, the watermark is visible after authentication and is subordinate to authentication.

It is also noted that, in one embodiment, authentication is required for watermark display. As a result, a valid watermark is displayed upon proper authentication.

At 350, in one embodiment, optically machine-readable information is displayed for access to an account of the payment system. For example, optically machine readable information 124 (e.g., a QR code) is displayed concurrently with animated digital watermark 126. Optically machine readable information 124 provides information such that user account 152 is able to be accessed for a purchase transaction.

FIG. 4 depicts flow diagram 400 for a method for displaying an animated digital watermark, according to various embodiments.

Referring now to FIG. 4, at 410, optically machine-readable information is displayed on a display screen of a mobile device, wherein the optically machine-readable information provides access to a consumer credit line. For example, mobile payment card 122 is displayed on display 120. Mobile payment card 122 includes optically machine-readable information 124 (e.g., a bar code), that when scanned, provides account information and/or access to user account 152 of payment system 150, which can be a consumer credit line.

At 420, an animated digital watermark is displayed on the display screen to ensure that the optically machine-readable information is displayed within an authentic mobile application on the mobile device. For example, referring to FIG. 2A, animated digital watermark 126 (e.g., a spinning logo) is displayed. As a result, it is ensured that optically machine-readable information 124 of mobile payment card 210 is authentic and not a fraudulent copy.

At 430, in response to user interaction with the animated digital watermark, additional information is displayed to further ensure authenticity of the displayed optically machine-readable information. For example, referring to FIG. 2B, message 230 is displayed in response to animated digital watermark 126 being touched on a touch screen of the mobile device. As a result, it is further ensured that the displayed mobile payment card (and optically machine-readable information 124) is not a part of a fraudulent captured video of an authentic mobile payment card.

At 440, in one embodiment, a user linked to an account of a payment system is authenticated. For example, the user of mobile device 110 has user account 152 (e.g., a consumer line of credit) with payment system 150 (e.g., a bank). Accordingly, the user provides his login name and password such that the user is authenticated to display mobile payment card 122 on device 110.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents. Moreover, examples and embodiments described herein may be implemented alone or in various combinations with one another.

What is claimed is:

1. A computer-implemented method for displaying an animated digital watermark, said method comprising:

displaying a mobile payment card on a mobile display screen, wherein said mobile payment card is linked to a payment system;

displaying a user-interactive animated digital watermark on said mobile display screen to ensure authenticity of said displayed mobile payment card, wherein an animation of said animated digital watermark is visually perceptible to a human viewing the mobile display screen; and displaying additional information to further ensure authenticity of said displayed mobile payment card in response to a human interaction with said animated digital watermark.

2. The computer-implemented method of claim 1 wherein said additional information is a message displayed in a pop-up window.

3. The computer-implemented method of claim 1, wherein said animated digital watermark changes shape while being displayed.

4. The computer-implemented method of claim 1, further comprising:

authenticating a user linked to an account of a payment system.

5. The computer-implemented method of claim 1, further comprising:

displaying an optically machine-readable information for access to an account of said payment system.

6. The computer-implemented method of claim 5, wherein said optically machine-readable information provides access to a consumer credit line.

7. A computer-implemented method for displaying an animated digital watermark, said method comprising:

displaying a mobile payment card on a mobile display screen, wherein said mobile payment card is linked to a payment system;

displaying an animated digital watermark on said mobile display screen to ensure authenticity of said displayed mobile payment card; and displaying an optically machine-readable information for access to an account of said payment system, wherein said optically machine-readable information and said animated digital watermark are displayed within an authentic mobile application on a mobile device.

8. The computer-implemented method of claim 7, wherein said displaying an animated digital watermark on said display screen, further comprises:

displaying a user-interactive animated digital watermark.

9. The computer-implemented method of claim 7, further comprising:

in response to user interaction with said animated digital watermark, displaying additional information to further ensure authenticity of said displayed mobile payment card.

10. The computer-implemented method of claim 9, wherein said additional information is a message displayed in a pop-up window.

11. The computer-implemented method of claim 7, wherein said animated digital watermark is visually perceptible.

12. The computer-implemented method of claim 7, wherein said animated digital watermark changes color while being displayed.

13. The computer-implemented method of claim 7, further comprising:

authenticating a user linked to an account of a payment system.

14. The computer-implemented method of claim 7, wherein said optically machine-readable information provides access to a consumer credit line.

* * * * *